United States Patent
Dilger et al.

[11] Patent Number: 6,060,881
[45] Date of Patent: May 9, 2000

[54] FLUX SHAPING POLE PIECES FOR A MAGNETIC DISPLACEMENT SENSOR

[75] Inventors: John Patrick Dilger, Marshalltown; Nile Kenton Dielschneider, Conrad, both of Iowa

[73] Assignee: Fisher Controls International, Inc., Austin, Tex.

[21] Appl. No.: 08/906,773

[22] Filed: Aug. 6, 1997

[51] Int. Cl.[7] .................................................. G01B 7/14
[52] U.S. Cl. ................................. 324/207.22; 324/207.24
[58] Field of Search ........................... 324/207.22, 207.2, 324/207.21, 207.23, 207.24, 207.25, 207.26, 252, 260, 262; 338/32 H, 32 R

[56] References Cited

U.S. PATENT DOCUMENTS

| | | | |
|---|---|---|---|
| 3,112,464 | 11/1963 | Ratajski et al. | 338/32 H |
| 4,532,810 | 8/1985 | Prinz et al. | 73/717 |
| 4,570,118 | 2/1986 | Tomczak et al. | 324/207.2 |
| 4,585,029 | 4/1986 | Harding | 137/625.62 |
| 4,665,362 | 5/1987 | Abel et al. | 324/207.2 |
| 4,870,864 | 10/1989 | Io | 73/517 R |
| 4,935,698 | 6/1990 | Kawaji et al. | 324/207.2 |
| 5,359,288 | 10/1994 | Riggs et al. | 324/207.22 |
| 5,497,081 | 3/1996 | Wolf et al. | 324/207.12 |

FOREIGN PATENT DOCUMENTS

| | | |
|---|---|---|
| 872 072 A | 7/1961 | United Kingdom . |
| 154 340 A | 9/1985 | United Kingdom . |

OTHER PUBLICATIONS

Patent Abstracts of Japan, vol. 15, No. 115, Mar. 19, 1991, JP 03 004123 A.
Patent Abstract of Japan, vol. 18, No. 504, Sep. 21, 1994, JP 06 176916 A.

*Primary Examiner*—Jay M. Patidar
*Attorney, Agent, or Firm*—Kinney & Lange

[57] ABSTRACT

A displacement sensor includes a magnet assembly having a housing for mounting to one of first and second relatively moveable elements. First and second magnets are mounted to the magnet assembly housing so that the north pole of one magnet confronts the south pole of the other magnet, and vice versa. The first and second magnets form a longitudinal space between them. A flux-shaping pole piece on each of the poles have configurations to sculpt fringing magnetic flux in the longitudinal space so that magnetic flux density in the longitudinal space varies substantially linearly along a line in the longitudinal space between the confronting poles of the magnets. A magnetic field sensor assembly has a housing for mounting to the other of the first and second elements. A magnetic flux sensor is mounted to the sensor housing on the line in the longitudinal space between the first and second magnets. In one embodiment, each of the flux-shaping pole pieces has a pentagon shape in a plane of primary flux pattern, forming a narrow face confronting the longitudinal space between the first and second magnets. The narrow face of each flux-shaping pole piece is wider across the primary flux pattern than along the length of the line in the longitudinal space.

22 Claims, 6 Drawing Sheets

FLUX SHAPING POLE PIECES FOR A MAGNETIC DISPLACEMENT SENSOR

BACKGROUND OF THE INVENTION

The present invention is a magnetic displacement sensor having a magnetic circuit reluctance that is constant with displacement. More specifically, the present invention is a magnetic displacement sensor having improved flux shaping pole pieces for improved performance.

Typically, magnetic displacement sensors include a flux generator that provides a constant source of magnetic flux and a pickup device that measures flux. Typically, the flux generator is mounted to one element and the pickup device is mounted to another element so that the magnetic flux density sensed by the pickup device is based on the displacement between the elements. Magnetic displacement sensors typically measure linear or rotational displacement and provide an output proportional to absolute linear or rotary position displacement of the elements. Magnetic displacement sensors may employ either electromagnets or permanent magnets as a source of magnetic flux. A pickup device (e.g., a magnetoresistor, a magnetodiode, or a Hall effect sensor) intersects the magnetic flux and detects changes in the magnetic field produced by the magnets.

Magnetic displacement sensors are commonly used in cooperation with microprocessors in remote control systems with field devices. For example, magnetic displacement sensors can be used to monitor valve position. Examples of prior art magnetic displacement sensors are found in Prinz et al. U.S. Pat. No. 4,532,810, Wolf et al. U.S. Pat. No. 5,497,081, and Riggs et al. U.S. Pat. No. 5,359,288.

The useful range of prior art magnetic displacement sensors is limited by the magnets' fringing flux. When two permanent magnets are adjacently aligned, the mechanical characteristic of each magnet and its proximity of another magnet pole face dictate the distribution of magnetic flux from pole face to opposite pole face. At the magnetic poles, fringing flux appears between the magnets. Fringing flux variations are non-linear and, therefore, the magnetic field detected by the magnetic displacement sensor varies non-linearly with displacement. This non-linearity results in inaccurate and erroneous sensor readings, limiting the useful range and effectiveness of magnetic displacement sensors.

BRIEF SUMMARY OF THE INVENTION

The present invention is directed to flux-shaping pole pieces for the magnet pole faces of a magnetic displacement sensor.

In accordance with one aspect of the invention, a displacement sensor senses relative displacement between first and second elements. The displacement sensor includes a magnet assembly having a housing for mounting to one of the first and second elements. First and second magnets are mounted to the magnet assembly housing so that the north pole of one magnet confronts the south pole of the other magnet and vice versa. The magnet assembly housing supports the first and second magnets to form a longitudinal space between the first and second magnets. A flux-shaping pole piece is provided on each of the poles of the first and second magnets. The flux-shaping pole pieces together having configurations to sculpt fringing magnetic flux in the longitudinal space so that magnetic flux density in the longitudinal space varies substantially linearly along a line in the longitudinal space between a point between the north pole of the first magnet and the south pole of the second magnet and a point between the south pole of the first magnet and the north pole of the second magnet. A magnetic field sensor assembly has a housing for mounting to the other of the first and second elements. A magnetic flux sensor is mounted to the sensor housing on the line in the longitudinal space between the first and second magnets.

In one embodiment of the displacement sensor, the flux-shaping pole pieces are metal pole pieces appended to each pole of the first and second magnets. The magnetic force exhibited by the magnets may be employed to hold the pole pieces in contact with the magnet poles. Alternatively, the pole pieces may be bonded to the magnetic poles with adhesive.

In another embodiment of the displacement sensor, the flux-shaping pole pieces are integral to the respective first and second magnet.

In yet another embodiment of the displacement sensor, the first and second magnets are permanent magnets.

In yet another embodiment of the displacement sensor, each of the flux-shaping pole pieces has a pentagon shape in a plane of primary flux pattern, forming a narrow face confronting the longitudinal space between the first and second magnets. In one aspect of this embodiment of the displacement sensor, the narrow face of each flux-shaping pole piece is wider across the primary flux pattern than along the length of the line in the longitudinal space.

In accordance with another aspect of the invention, a flux-shaping pole piece is provided for a pole of a magnet of a magnetic displacement sensor which senses relative displacement between first and second elements. The magnet is to be arranged with another magnet so that a north pole of one magnet confronts a south pole of the other magnet and vice versa to form a longitudinal space between the magnets. The pole piece comprises a magnetic material shaped to sculpt fringing magnetic flux in the longitudinal space so that magnetic flux density in the longitudinal space varies substantially linearly along a line in the longitudinal space between a point between the north pole of one magnet and the south pole of the other magnet and a point between the south pole of the one magnet and the north pole of the other magnet.

In one embodiment of the flux-shaping pole piece, the flux-shaping pole piece is a metal pole piece appended to a pole of the magnet. The magnetic force exhibited by magnet may be employed to hold the pole piece in contact with the magnet pole. Alternatively, the pole piece may be adhesively attached to the magnetic pole.

In another embodiment of the flux-shaping pole piece, the flux-shaping pole piece is integral to the magnet.

In another embodiment of the flux-shaping pole piece, the flux-shaping pole piece has a pentagon shape in a plane of primary flux pattern, forming a narrow face confronting the longitudinal space between the magnets. In one aspect of this embodiment of the flux-shaping pole piece, the narrow face of the flux-shaping pole piece is wider across the primary flux pattern than along the length of the line in the longitudinal space.

DETAILED DESCRIPTION OF THE PREFERRED EMBODIMENTS

Figure 1:
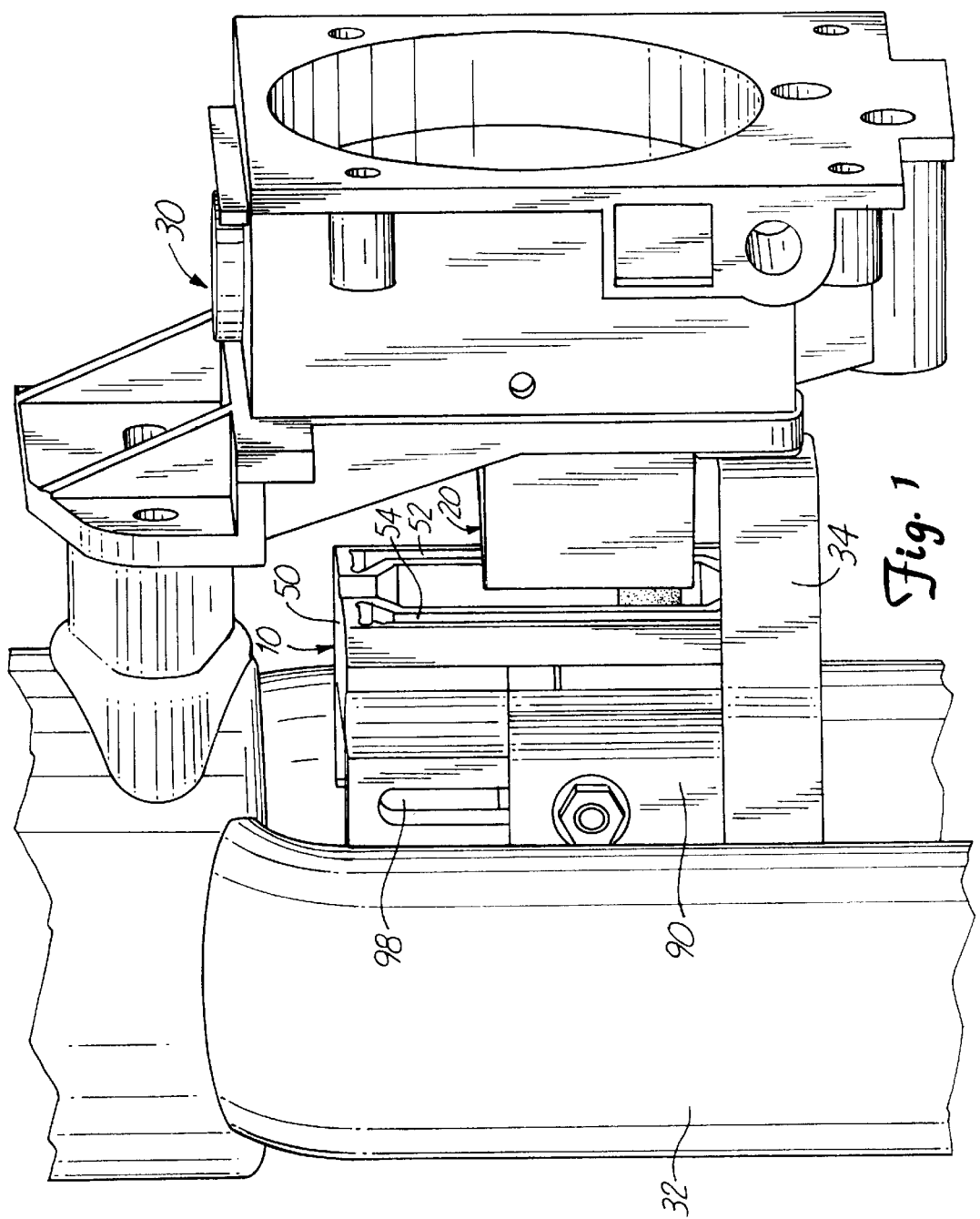
FIG. 1 is a perspective view of a magnetic displacement sensor with flux shaping pole pieces of the present invention.
Figure 2:
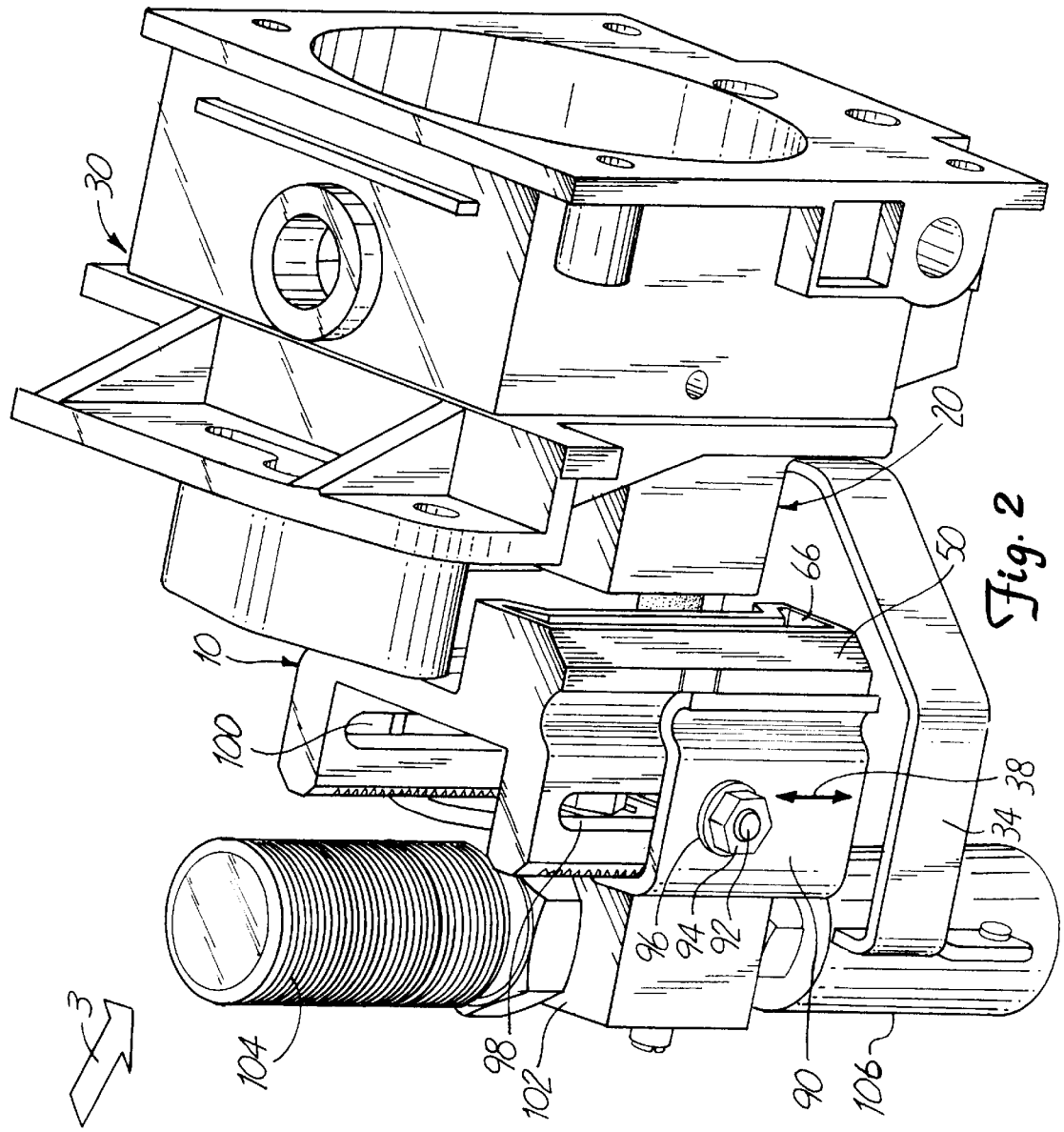
FIG. 2 is an enlarged perspective view, with portions removed for sake of clarity, of the magnetic displacement sensor shown in FIG. 1.

FIG. 1 is a perspective view of a magnetic displacement sensor with lux shaping pole pieces in accordance with the presently preferred embodiment of he present invention. The magnetic displacement sensor comprises a movable magnet assembly 10 (shown in greater detail in FIGS. 2–5) and a magnetic field sensor assembly 20. Magnetic field sensor assembly 20 is mounted to a stationary instrument housing 30 and a stationary actuator yoke 32 by mounting arm 34. As shown in FIG. 2, magnet assembly 10 is arranged for linear or reciprocal movement of valve stem 106 in the direction of arrow 38. Stem connector 102 is connected between actuator stem and 104 and valve stem 106. Actuator stem 104 transmits linear movement of a valve actuator, such as a pressure-responsive diaphragm (not shown) to valve stem 106, which in turn operates a valve plug (not shown) in a manner well known in the art to open and close the valve under control.

As shown particularly in FIGS. 2–5, magnet assembly 10 comprises a housing 50 supporting permanent bar magnets 52 and 54 in cavities 64 and 66. As shown particularly in FIG. 5, magnets 52 and 54 are arranged so that one of the magnets, such as magnetic 52, has its north pole 56 orientated towards the top of housing 50 and its south pole 58 orientated toward the bottom of housing 50. The other magnet, such as magnet 54, is oriented opposite to magnet 52 with its north pole 62 at the bottom of housing 50 and its south pole 60 at the top of housing 50. Housing 50 orients magnets 52 and 54 so that confronting surfaces 57 are parallel to each other and to longitudinal line 81 in the longitudinal space between the magnets. Although magnets 52 and 54 may be electromagnets or permanent magnets, a permanent magnet is preferred because it can be easily incorporated into the sensor and does not require a separate power source. Magnets 52 and 54 are preferably Alnico V magnets. It will be appreciated that magnets 52 and 54 are a constant magnetic flux source.

Figure 5:
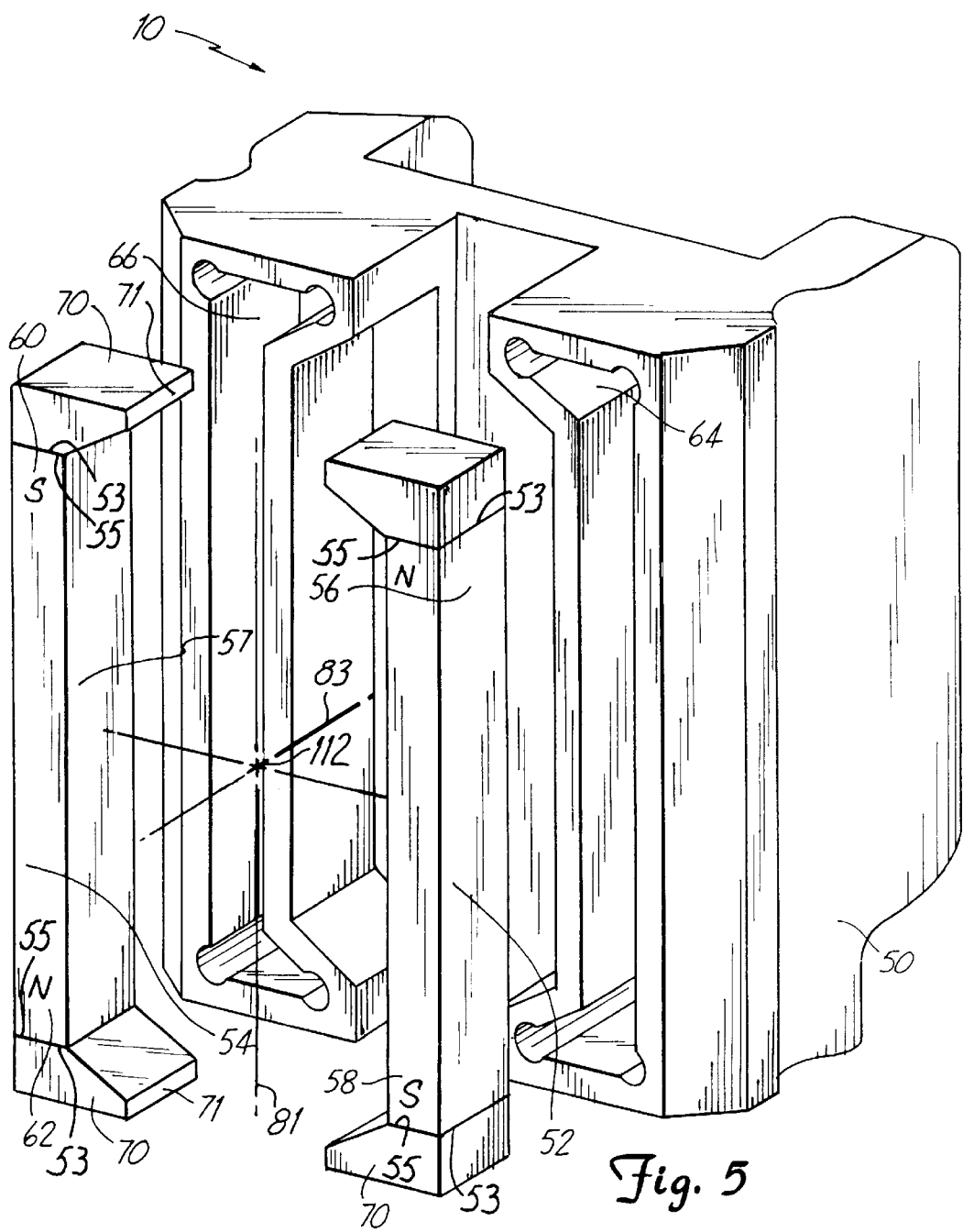
FIG. 5 is an exploded view of the magnet block assembly shown in FIGS. 3 and 4.

As shown particularly in FIG. 5, a flux shaping pole piece 70 is appended to each of poles 56, 58, 60, and 62 of magnets 52 and 54. Pole pieces 70 may be composed of any suitable magnetic material, such as G10100 cold-rolled steel. Because the pole pieces are magnetic, the magnetic force exhibited about magnets 52 and 54 holds pole pieces 70 in contact with the magnet poles, and epoxies, adhesives, or similar substances are not required. Alternatively, an adhesive may be employed to attach pole pieces 70 to the respective magnetic pole.

In an alternative embodiment of the present invention, flux shaping pole pieces 70 are not separate components from magnets 52 and 54, but are an integral part of the magnets themselves. Thus, magnets 52 and 54 can be cast with pole pieces 70 integrated as part of the magnets. In such an embodiment, each magnet (with pole pieces) is the singular component that is placed in cavities 64 and 66 of housing 50.

Pole pieces 70 provide optimal magnetic displacement sensor performance. Typically, magnets display fringing flux at the poles, resulting in non-linear flux variations that cause inaccurate or erroneous magnetic displacement sensor performance. Pole pieces 70 "sculpt" the magnetic flux to provide a linear change in flux density. By sculpting the fringing flux, pole pieces 70 linearize the flux measurements over the length of the magnets, thereby dramatically increasing the useful range of the magnets and the magnetic displacement sensor.

Figure 7:
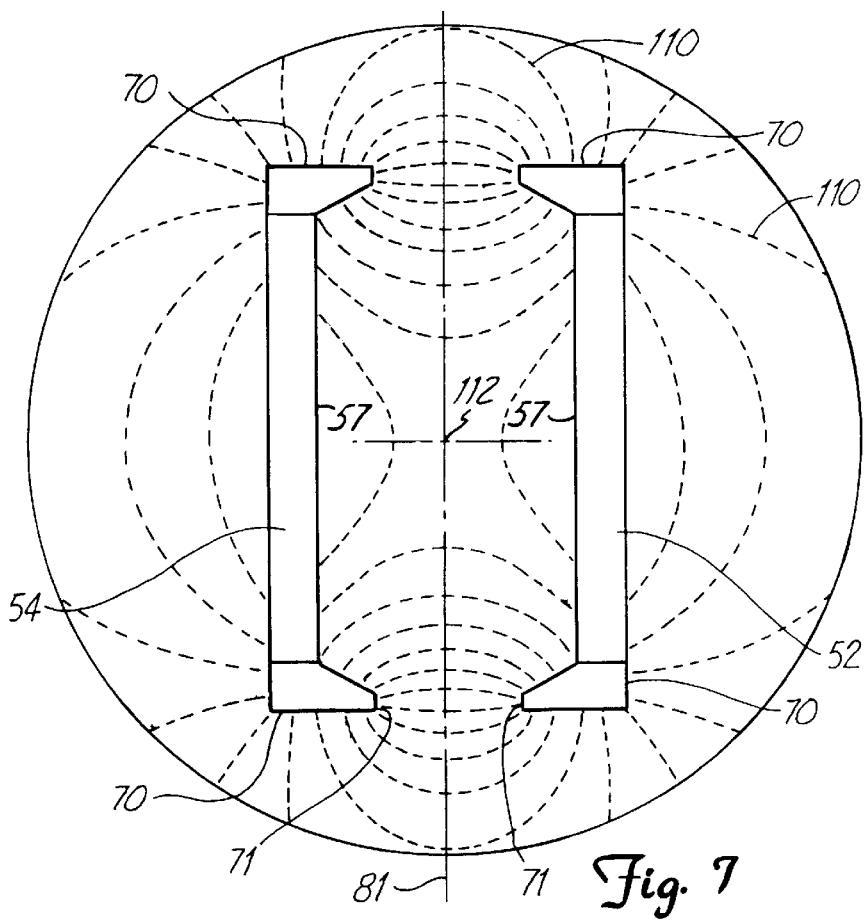
FIG. 7 is a diagram illustrating the magnet block assembly shown in FIGS. 3–5 and the associated flux pattern.

As shown particularly in FIGS. 5 and 7, pole pieces 70 have a pentagon shape, when viewed in the plane of the primary flux pattern (FIG. 7), having two pairs of parallel surfaces normal to each other. The narrow surface 71 of the pentagon forms a narrow face that is significantly wider across the primary flux pattern (into the paper of FIG. 7 and along line 83 in FIG. 5) than in the direction along the length of magnets 52 and 54. More particularly, we have experimentally determined that the pentagon shape of pole pieces 70 optimizes linear performance over the full length of the magnets of the magnetic displacement sensor. The size of the pentagon pole pieces 70 is based on the separation distance between magnets 52 and 54, the length of the magnets, and the cross-section area of the magnets. Thus, different magnet sizes and spacing require different pole piece pentagon size.

It is important to the present invention that face 71 of the respective pentagon pole pieces 70 be parallel to surface 57 of the respective bar magnet 52 and 54. If a face 53 of a pole of magnet is not perpendicular to the surface 57 of the respective magnet, it may be necessary to insert a magnetic shim or other spacer (or even an adhesive) between face 53 of the magnet and face 55 of the respective pole piece 70 to be certain that face 71 is parallel to surface 57 of the magnet. Hence, if the pole face 53 is nicked or otherwise damaged to provide a face not perpendicular to the length of the magnet, repair by shims may render the magnet usable.

Figure 3:
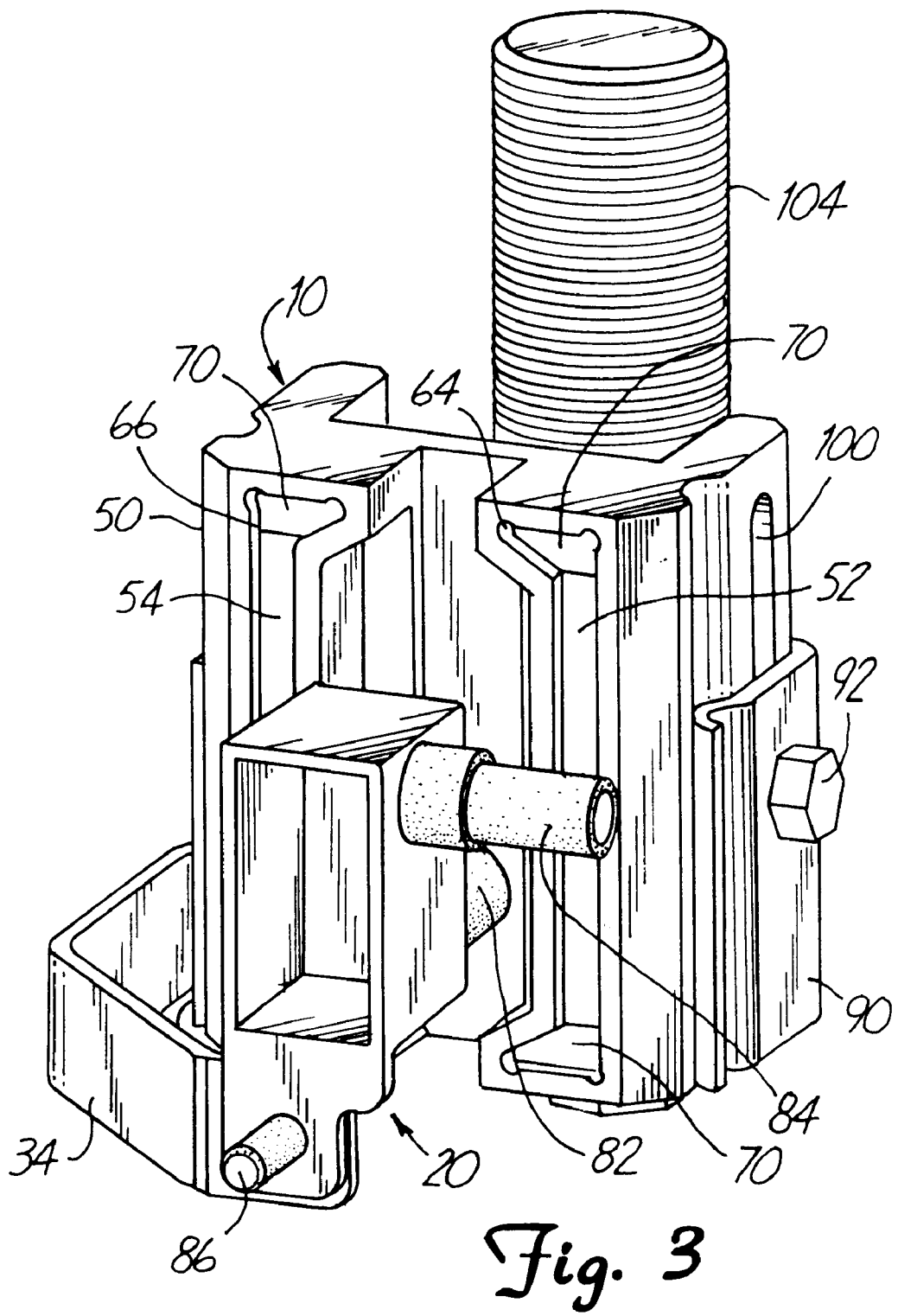
FIG. 3 is a perspective view of a magnet block assembly and a magnetic field sensor assembly of the magnetic displacement sensor taken generally in the direction of arrow 3 in FIG. 2.
Figure 4:
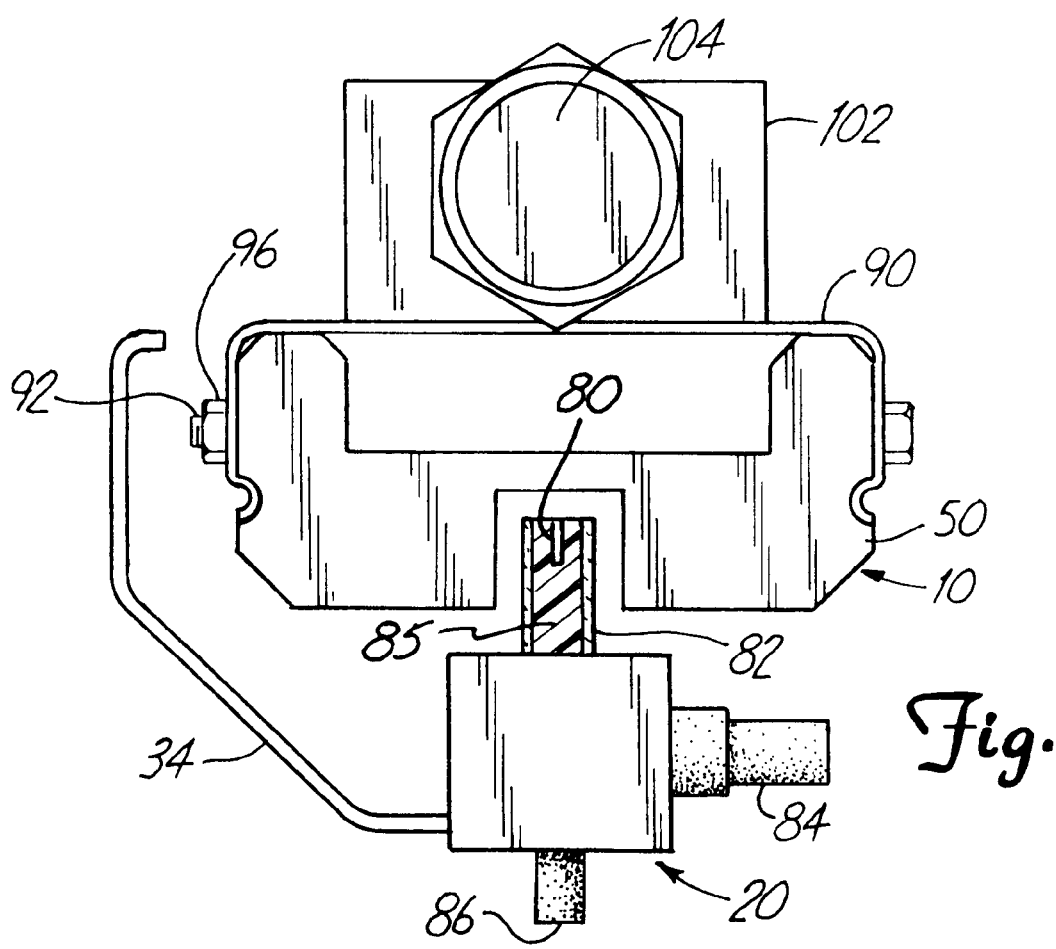
FIG. 4 is a top view of the assemblies shown in FIG. 3.

As illustrated in FIGS. 3 and 4, magnetic field sensor assembly 20 includes a nonmagnetic cylinder 82 which extends between magnets 52 and 54 in housing 50. Acceptable materials for cylinder 82 are Aluminum or Cermic. Cylinder 82 contains a magnetic field sensor 80, such as a Hall effect sensor, placed in proximity to magnet assembly 10 between magnets 52 and 54. Magnetic field sensor 80 is mounted within cylinder 82 by an acetal plastic bushing 85, keyed to precisely position sensor 80 within cylinder 82 to within 0.002 inches. Cylinder 84 plugs into instrument housing 30 (FIGS. 1 and 2) and permits the feed through for the wiring for electronics. In one form of the invention, housing 30 is formed of a suitable non-magnetic material such as aluminum or rigid plastic. Non-magnetic fastener 86 mounts the housing of sensor assembly 20 to housing 30, and mounting arm 34 mounts housing 30 to stationary actuator yoke 32.

As shown in FIG. 2, housing 50 of magnet assembly 10 is attached to bracket 90 by pin bolts 92, washers 94 and nuts 96) fastened through respective slots 98 and 100 in housing 50. Additionally, bracket 90 is connected to a stem connector 102 that couples a threaded actuator stem 104 to a valve stem 106 of a valve. Hence, magnet assembly 10 is rigidly mounted to the valve stem/actuator assembly of the valve whose position is being monitored by the displacement sensor of the present invention. As valve stem 106 moves in the direction of arrow 38, stem connector 102 and bracket 90 move magnet assembly 10 relative to magnetic field sensor assembly 20. Magnetic field sensor 80 (FIG. 6) remains stationary because it is coupled to stationary actuator yoke 32 and instrument housing 30. Movement of magnet assembly 10 in the direction of arrow 38 causes a relative displacement between the magnet assembly and magnetic field sensor 80 within magnetic field sensor assembly 20. Thus, the magnetic flux density through magnetic field sensor 80 varies with displacement of actuator 104 and valve stem 106.

Figure 6:
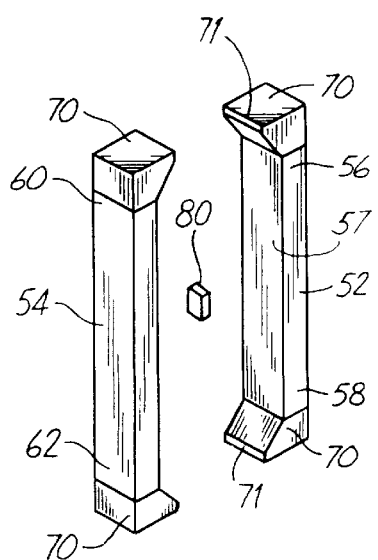
FIG. 6 is perspective view, with portions not shown for sake of clarity, of the magnets of the magnetic block assembly with a magnetic field sensor between the magnets.

FIG. 6 illustrates a perspective view of magnetic field sensor 80 located between magnets 52 and 54 appended with flux shaping pole pieces 70, and FIG. 7 illustrates the magnetic flux lines 110 between magnets 52 and 54. Preferably, magnets 52 and 54 are of equal magnetic strength, so that line 81 is centered between and parallel to surfaces 57 of magnets 52 and 54, line 83 is orthogonal to line 81 in a direction along the width of surfaces 57, and line 83 intersects line 81 at midpoint 112 centered between the pole pieces and centered between the edges of magnets 53 and 54 along the width of surfaces 57 (FIGS. 5 and 7). At point 112, the magnetic flux density is at a null (zero). The sensor is calibrated by placing sensor 80 at the midpoint 112 where magnetic field strength is zero and calibrating the sensor.

Along longitudinal line 81 between the magnets, the flux density increases uniformly from the midpoint of the assembly toward the poles, to a maximum flux density directly between pole faces 71. Because the poles are oppositely oriented, the flux directions are opposite at the regions along line 81 on each side of the midpoint. Hence, the flux density varies along line 81 from a maximum in one direction between one set of pole faces, through zero at midpoint 112, to a maximum in the opposite direction between the other set of pole faces. In use, magnetic field sensor 80 is oriented midway between magnets 52 and 54 on line 81 so that as the magnet assembly reciprocates in the direction of arrow 38 (FIG. 2) parallel to line 81, sensor 80 crosses the flux pattern between the slide-by magnets and produces a voltage proportional to the relative position of magnetic field sensor 80 in relation to magnet assembly 10. By sculpting the fringing flux, pole pieces 70 linearize the flux measurements over the length of the magnets. Thus, pole pieces 70 dramatically increase the useful range and accuracy of the voltage readings produced by magnetic field sensor 80.

Although the present invention has been described with reference to preferred embodiments, workers skilled in the art will recognize that changes may be made in form and detail without departing from the spirit and scope of the invention.

What is claimed is:

1. A displacement sensor for sensing relative displacement between first and second elements comprising:
   a magnet assembly having
      a magnet assembly housing for mounting to the first element,
      first and second magnets mounted to the magnet assembly housing so that a north pole of the first magnet confronts a south pole of the second magnet and a south pole of the first magnet confronts a north pole of the second magnet, wherein the magnet assembly housing supports the first and second magnets to form a longitudinal space between the first and second magnets, and
      a flux-shaping pole piece on each of the north and south poles of the first and second magnets, the flux-shaping pole pieces having configurations to sculpt fringing magnetic flux in the longitudinal space so that magnetic flux density in the longitudinal space varies substantially linearly along a line in the longitudinal space extending substantially parallel to the length of at least one of the magnets and between the confronting poles of the first and second magnets; and
   a magnetic field sensor assembly having
      a sensor housing for mounting to the second element, and
      a magnetic flux sensor mounted to the sensor housing on the line in the longitudinal space between the first and second magnets.

2. The displacement sensor of claim 1, wherein the first and second magnets are permanent magnets.

3. The displacement sensor of claim 1, wherein each of the flux-shaping pole pieces is a metal pole piece appended to a respective pole of the first and second magnets.

4. The displacement sensor of claim 3 wherein the pole pieces are attached to the respective pole by a magnetic force exhibited by the respective magnet.

5. The displacement sensor of claim 1, wherein each of the flux-shaping pole piece is integral to the respective first and second magnet.

6. The displacement sensor of claim 1, wherein the first and second magnets are I-magnets of substantially equal lengths and substantially equal widths and having poles at opposite ends, wherein the I-magnets form confronting surfaces substantially parallel to each other to form the longitudinal space and wherein the line in the longitudinal space is substantially parallel to both confronting surfaces and extends the length of the magnets at a location midway between the confronting surfaces and midway across the widths of the magnets.

7. The displacement sensor of claim 1, wherein each of the flux-shaping pole pieces has a pentagon shape in a plane of a primary flux pattern across the longitudinal space, the pentagon shape forming a narrow face confronting the longitudinal space between the first and second magnets and parallel to the line in the longitudinal space.

8. The displacement sensor of claim 7, wherein the narrow face is in a plane parallel to the length of the respective magnet.

9. The displacement sensor of claim 8, wherein each of the poles has a pole face substantially perpendicular to the length of the respective magnet, and each of the flux-shaping pole pieces is a metal pole piece having a second face appended to a respective pole face, the second face being perpendicular to the narrow face, and the pole piece being oriented on the respective pole so that the narrow face is parallel to the length of the magnet.

10. The displacement sensor of claim 9, wherein the narrow face of each flux-shaping pole piece is wider across the primary flux pattern than along the line in the longitudinal space.

11. The displacement sensor of claim 7, wherein the narrow face of each flux-shaping pole piece is wider across the primary flux pattern than along the line in the longitudinal space.

12. The displacement sensor of claim 7, wherein each of the flux-shaping pole pieces is a metal pole piece appended to a respective pole of the first and second magnets.

13. The displacement sensor of claim 12, wherein the narrow face of each flux-shaping pole piece is wider across the primary flux pattern than along the length of the line in the longitudinal space.

14. The displacement sensor of claim 7, wherein one of the first and second elements is a valve actuator and valve stem housing and the other of the first and second elements is a stationary housing, whereby the displacement sensor senses linear displacement between the valve stem and the stationary housing.

15. The displacement sensor of claim 1, wherein one of the first and second elements is a valve actuator and valve stem housing and the other of the first and second elements is a stationary housing, whereby the displacement sensor senses linear displacement between the valve stem and the stationary housing.

16. A flux-shaping pole piece for a pole of a first magnet of a magnetic displacement sensor displacement sensor for sensing relative displacement between first and second elements, wherein the first magnet is to be arranged with a second magnet so that a north pole of the first magnet confronts a south pole of the second magnet and a south pole of the first magnet confronts a north pole of the second magnet to form a longitudinal space between the first and second magnets, the pole piece comprising:

a magnetic material having an attachment surface arranged to attach to the pole of the first magnet, and a configuration so disposed and arranged so that when a pole piece is attached to the poles of the first and second magnets each of the pole pieces sculpt fringing magnetic flux in the longitudinal space so that magnetic flux density in the longitudinal space varies substantially linearly along a line in the longitudinal space between the confronting poles of the first and second magnets.

17. The flux-shaping pole piece of claim 16, wherein the flux-shaping pole piece is a metal pole piece for appending to a pole of the first-named magnet.

18. The flux-shaping pole piece of claim 17, wherein the pole piece is designed to be held in contact with the magnet pole by a magnetic force exhibited by first-named magnet.

19. The flux-shaping pole piece of claim 18 having a pentagon shape in a plane of primary flux pattern across the longitudinal space arranged to form a narrow face confronting the longitudinal space between the first-named and other magnets and parallel to the line in the longitudinal space when the pole piece is attached to the magnet pole.

20. The flux-shaping pole piece of claim 19, wherein the narrow face is arranged parallel to the length of the magnet when the pole piece is attached to the magnet pole.

21. The flux-shaping pole piece of claim 20, wherein the attachment surface is perpendicular to the narrow face, the attachment surface orienting the pole piece on the pole so that the narrow face is parallel to the length of the magnet.

22. The flux-shaping pole piece of claim 19, wherein the narrow face of the flux-shaping pole piece is wider across the primary flux pattern than along the length of the line in the longitudinal space when the pole piece is attached to the magnet pole.

* * * * *

UNITED STATES PATENT AND TRADEMARK OFFICE
CERTIFICATE OF CORRECTION

PATENT NO. : 6,060,881
DATED : May 9, 2000
INVENTOR(S) : John Patrick Dilger et al.

It is certified that error appears in the above-identified patent and that said Letters Patent is hereby corrected as shown below:

Column 6,
Line 20, delete "piece", insert -- pieces --

Column 7,
Line 10, delete "second occurrence of "displacement sensor"

Column 8,
Line 6, after "exhibited by", insert -- the --

Signed and Sealed this

Twenty-eighth Day of August, 2001

Attest:

NICHOLAS P. GODICI
*Attesting Officer*     *Acting Director of the United States Patent and Trademark Office*